(12) United States Patent
Meisser et al.

(10) Patent No.: US 8,575,524 B2
(45) Date of Patent: Nov. 5, 2013

(54) HEATING PLATE FOR WORKPIECES

(75) Inventors: Claudio Meisser, Cham (CH); Markus Bucher, Buchrain (CH)

(73) Assignee: komax Holding AG, Dierikon (CH)

( * ) Notice: Subject to any disclaimer, the term of this patent is extended or adjusted under 35 U.S.C. 154(b) by 1093 days.

(21) Appl. No.: 12/384,399

(22) Filed: Apr. 3, 2009

(65) Prior Publication Data

US 2009/0250455 A1 Oct. 8, 2009

(30) Foreign Application Priority Data

Apr. 4, 2008 (EP) ..................... 08006869

(51) Int. Cl.
- H05B 6/10 (2006.01)
- B29B 13/02 (2006.01)
- B30B 15/06 (2006.01)

(52) U.S. Cl.
CPC ............. B29B 13/023 (2013.01); B30B 15/064 (2013.01); H05B 6/107 (2013.01)
USPC .......................................... 219/628; 219/646

(58) Field of Classification Search
USPC .......... 219/10.73, 10.67, 10.69, 10.71, 10.75, 219/10.79, 10.49 R, 10.43, 10.57, 10.61 R, 219/243, 245, 246, 254, 255, 443, 457, 458, 219/460, 615–618, 659–683, 635, 645, 647, 219/649; 100/92, 93 R, 93 P; 165/168; 218/159; 228/265, 157; 29/10.71, 29/10.75, 10.79, 10.49 R, 10.43, 10.57, 29/10.61 R, 243, 245, 246, 254, 255, 443, 29/457, 458, 460
See application file for complete search history.

(56) References Cited

U.S. PATENT DOCUMENTS

| 2,572,972 | A | * | 10/1951 | Baldwin | ........................ 165/168 |
| 4,649,249 | A | * | 3/1987 | Odor | .............................. 219/659 |
| 5,558,015 | A | | 9/1996 | Miyashita et al. | |
| 6,788,537 | B2 | * | 9/2004 | Saita et al. | .................... 361/700 |
| 2005/0121435 | A1 | | 6/2005 | Hofer-Noser et al. | |
| 2006/0219709 | A1 | * | 10/2006 | Kagan | .......................... 219/661 |

FOREIGN PATENT DOCUMENTS

| DE | 1703553 | 3/1972 |
| DE | 2757109 | 6/1979 |
| DE | 31 12 651 | 10/1982 |
| EP | 1 340 611 | 9/2003 |

(Continued)

OTHER PUBLICATIONS

European Search Report dated Aug. 3, 2009 with English translation of relevant parts.

*Primary Examiner* — Henry Yuen
*Assistant Examiner* — Thien S Tran
(74) *Attorney, Agent, or Firm* — Collard & Roe, P.C.

(57) ABSTRACT

The heating plate (2) for workpieces comprises a heatable body (20) which on a first side has a contact surface (15) for the respective workpiece, at least one heating channel (25) filled with a heating fluid for heating the heatable body (20), which heating channel (25) is formed in and/or on the heatable body (20) opposite the contact surface (15) and heating means (35) for heating the heating fluid. A channel wall (25.1) of the respective heating channel (25) may be inductively heated and the heating means (35) comprise at least one heating device (35.1) for inductively heating the respective channel wall (25.1), the heating device (35.1) being arranged outside the respective heating channel (25) and the heating fluid in the respective heating channel (25) being able to be heated by a transfer of heat which may be generated by means of the heating device (35.1) in the channel wall (25.1).

7 Claims, 8 Drawing Sheets

(56) References Cited

FOREIGN PATENT DOCUMENTS

| | | | |
|---|---|---|---|
| EP | 1 517 585 | | 3/2005 |
| GB | 890 940 | | 3/1962 |
| GB | 890940 | * | 3/1962 |
| GB | 1 003 337 | | 9/1965 |

* cited by examiner

HEATING PLATE FOR WORKPIECES

CROSS REFERENCE TO RELATED APPLICATIONS

This applicantion claims priority under 35 U.S.C. §119 of European Application No. 08006869.5 filed Apr. 4, 2008.

BACKGROUND OF INVENTION

1. Field of the Invention

The invention relates to a heating plate for workpieces, comprising a heatable body which on a first side has a contact surface for the respective workpiece.

2. The Prior Art

Heating plates of this type are, for example, used for laminating workpieces and in this connection, in particular, used in laminating presses for producing photovoltaic modules. During lamination, a thin, generally film-like layer is attached to a carrier material. In many cases, for example during the production of photovoltaic modules, it is necessary to carry out the laminating process at raised temperatures (hot lamination). In this connection, generally the workpiece to be processed (i.e. the carrier material covered by the layer to be attached) is arranged on a contact surface for the workpiece configured on a heating plate, heated to a predetermined temperature and subsequently pressed. For the laminating process, it is important that the temperature distribution on the contact surface is as uniform as possible for the respective workpiece.

A first type of such a heating plate generally has rod-shaped heating devices, which are directly attached to a heating plate body. As the heat is discharged via thermal conduction to the heating plate body, a contact which is as efficient as possible between the respective heat sources of the heating devices and the heating plate body is required. This is achieved by inserting the heating devices in precisely manufactured grooves, the heating devices being able to be clamped and the thermal conduction being able to be additionally improved by applying heat conducting paste. However, even under optimal conditions, it is also difficult to achieve an uniform temperature distribution over a large surface. This is a drawback with regard to the lamination of large-surfaced workpieces, for example for producing photovoltaic modules, which may have a surface area of more than 1 m$^2$.

In a second type of heating plate, as is disclosed for example in EP1340611 A2, cavities are provided through which a liquid heat transfer medium flows, which is used for heating and/or cooling the respective heating plate. The heating, the cooling and the temperature adjustment of the heat transfer medium takes place in this case outside the heating plate by means of a heating circuit, which comprises a heating unit, and a cooling circuit, which has at least one cooler. The heating unit and the respective cooler for the heat transfer medium are in this case connected via various conduits to the respective cavities of the heating plate. As the heat transfer medium discharges and/or absorbs a great deal of thermal energy when flowing through the cavities of the heating plate, which are generally relatively long, it is also difficult with this type of heating plate to keep the temperature constant for the respective workpiece over the entire contact surface.

In EP1517585 B1 a further type of heating plate is disclosed, in which a heating fluid is used for heating, which flows through cavities formed in the respective heating plate. The heating fluid is in this case heated by heating elements, which are located within the cavities and around which the heating fluid flows. This solution is costly, as the heating elements have to be electrically insulated and sealed against the fluid. Moreover, all heating elements are provided with spacers which ensure a centering of the heating elements in the respective cavities, in order to prevent a direct contact of the heating elements with the walls of the cavities. In this case it is difficult to accommodate such heating elements in cavities where there is a complicated arrangement of cavity walls, for example in a system consisting of a plurality of cavities which are angled relative to one another, or in cavities which are repeatedly branched. Accordingly it is possible that the aforementioned heating elements are not able to be installed in cavities where there is a complicated arrangement of cavity walls, or possibly only at considerable cost. This is a drawback with regard to the heating of heating plates which have a large contact surface and are intended for heating large-surfaced workpieces.

SUMMARY OF THE INVENTION

Proceeding from the aforementioned prior art, the object of the invention is to avoid the aforementioned drawbacks and to provide a heating plate which may be heated by a heating fluid and which makes it possible to achieve by simple means a temperature which is as constant as possible on a contact surface for the workpiece to be heated.

This object is achieved by a heating plate comprising the features of Claim 1.

Said heating plate comprises a heatable body which on a first side has a contact surface for the respective workpiece, at least one heating channel for heating the heatable body, which heating channel is formed in and/or on the heatable body opposite the contact surface, and is filled with a heating fluid and heating means for heating the heating fluid.

According to the invention, a channel wall of the respective heating channel may be inductively heated and the heating means comprise at least one heating device for inductively heating the respective channel wall, the heating device being arranged outside the respective heating channel and the heating fluid in the respective heating channel being able to be heated by a transfer of heat, which may be generated in the channel wall by means of the heating device.

As the heating means are arranged outside the respective heating channel, the heating means may be mounted at relatively low cost on the heatable body. In this connection, the respective arrangement and/or shape of the respective heating channel does not restrict and/or does not substantially restrict the choice of location at which the respective heating means may be placed on the heatable body, in particular complications which might be associated with the installation of heating means in the respective heating channel, are avoided in principle.

As the heating means according to the invention are arranged such that the heat, which may be produced by the heating means, may be introduced through a channel wall of the respective heating channel into the heating fluid, and as the respective heating channel is arranged opposite the contact surface for the workpiece, it is further ensured that thermal losses in the heating fluid, respectively in the vicinity of the contact surface for the workpiece, may be compensated. As a result, the possibility is provided of implementing a uniform temperature distribution on the contact surface.

As the channel wall of the respective heating channel may be inductively heated, and the respective heating device is configured for inductively heating the channel wall, it is achieved that the channel wall is efficiently heated and heat in the heating fluid may be conveyed, even if the heating device is not in contact with the channel wall. The heating device may be arranged at a distance from the channel wall, for example on the side of the heatable body remote from the contact surface. This simplifies the mounting of the heating device.

In order to permit inductive heating of the channel wall, the channel wall may be made from an electrically conductive material, for example a metal. In order to optimise the efficiency of the inductive heating of the channel wall, the channel wall may be made from a magnetisable material, for example a ferromagnetic material, in particular a ferromagnetic metal, such as iron or an iron alloy (for example steel). By a suitable choice of materials for the heatable body and/or for the respective channel wall it may be achieved that by means of the heating device heat is generated substantially only in the channel wall. This leads to an efficient transportation of the generated heat into the heating fluid and to a particularly uniform distribution of this heat over the entire volume of the heatable body.

Within the scope of the invention, the temperature distribution on the contact surface may be influenced by different measures. The uniformity of the temperature distribution on the contact surface, for example, may be influenced and correspondingly optimised by the spatial arrangement of the respective heating channel and/or the respective heating channels and/or the spatial arrangement of the respective heating means. The uniformity of the temperature distribution on the contact surface may further be influenced and correspondingly optimised by specifically influencing the spatial distribution of the respective heat flow which is introduced in specific regions of the respective channel wall into the heating fluid. In order to minimise and/or to compensate for temperature differences between different locations on the contact surface, for example a plurality of heating devices may be arranged outside the respective heating channel and/or the heating channels, the thermal output which the individual heating devices discharge through the respective channel walls to the heating fluid being able to be varied respectively from one location to another. Moreover, the respective heating channels may be designed such that the circulation of the heating fluid is made possible in the respective heating channels, optionally forced by a pump which ensures a flow of the heating fluid through the respective heating channels. Also, this measure may contribute to achieving a uniform spatial distribution of the temperature on the contact surface.

BRIEF DESCRIPTION OF THE DRAWINGS

Further details of the invention and, in particular, exemplary embodiments of the invention are explained hereinafter with reference to the accompanying drawings, in which.

DETAILED DESCRIPTION OF THE PREFERRED EMBODIMENTS

Figure 1:
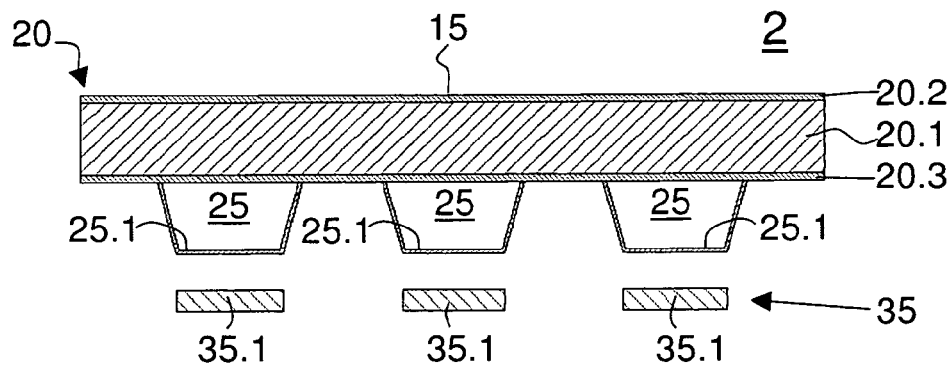
FIG. 1 shows a cross section through a first embodiment of the heating plate according to the invention, comprising a heatable body, a heating channel and heating means, which heating means comprise a plurality of heating devices for the inductive heating of the respective channel walls.

FIG. 1 shows a cross section through a heating plate 2, which comprises a heatable body 20, a heating channel 25 filled with a heating fluid and heating means 35 for heating the heating fluid. The heatable body 20 has on one side a contact surface 15 with which a workpiece to be heated by means of the heating plate 2 may be brought into contact. In the present case, the heatable body 20 is configured as a flat plate.

The heating channel 25 is arranged on the side of the heatable body 20 located opposite the contact surface 15. In order to bring a part of the surface of the heatable body, which is as large as possible, into contact with the heating fluid guided in the heating channel 25, the heating channel 25 has a plurality of different longitudinal portions, of which some are arranged parallel to one another and others at right angles to one another, the longitudinal portions being connected to one another such that the heating fluid in the heating channel 25 may circulate along a closed path along the surface of the heatable body 20.

FIG. 1 shows a plurality of longitudinal portions of the heating channel 25 in cross section. The channel wall 25.1 of the heating channel 25 has in the present case a trapezoidal profile in cross section and on two sides is connected respectively to the heatable body 20 such that the heating channel 25 is sealed for the heating fluid. In this case, the channel wall 25.1, for example, may be designed as a sheet metal construction. The fastening of the channel wall 25.1 to the heatable body 20 may, for example, take place by a screw connection or by a welded connection. A welded connection has the advantage that no sealing is necessary.

The heating means 35 are arranged outside the heating channel 25.1 and comprise a plurality of heating devices 35.1 for inductively heating the channel wall 25.1, provided that the channel wall consists of a material which may be inductively heated. In the present case, the channel wall 25.1 may be made, for example, from an electrically conductive material, for example of a metal and/or a magnetisable material, for example a ferromagnetic material, in particular a ferromagnetic metal such as iron or an iron alloy (for example steel). The heating means 35 thus permit the channel wall 25.1 to be heated up from the outside in different regions. The heating of the heating fluid takes place by heat transfer from the heated channel wall 25.1 to the heating fluid. The heat which may be generated by means of the heating means 35, is accordingly able to be introduced by the heating devices 35.1 through the channel wall 25.1 of the heating channel 25 into the heating fluid.

As indicated in FIG. 1, the heating devices 35.1 must not come into contact with the channel wall 25.1. Components made of non-magnetisable material or of materials which may not be heated or not substantially heated by the heating devices 35.1 (for example thermally insulating materials) and thus do not absorb a substantial part of the thermal output of the heating devices 35.1, may possibly be located between the channel 25 and the heating devices 35.1.

The heatable body 20 may, as indicated in FIG. 1, be of multilayered construction: in the present case the body 20 consists of (i) a flat plate 20.1, (ii) a flat layer 20.2, the one side thereof forming the contact surface 15 and the other side thereof being connected to the plate 20.1 on a surface of the plate 20.1 facing the contact surface 15, and (iii) a layer 20.3 which is connected to the plate 20.1 on a surface of the plate 20.1 remote from the contact surface 15.

The multilayered construction of the heatable body 20 permits, in particular, an optimisation with regard to the mechanical and thermal properties of the body 20. Generally it is advantageous if the plate 20.1 and the layers 20.2 and 20.3 have a thermal conductivity which is as high as possible and/or a weight as low as possible and/or may be produced cost-effectively. The plate 20.1 may be designed such that it takes up the largest part of the volume of the body 20 and ensures the mechanical stability of the body 20. The layer 20.2 may, for example, be designed such that the heatable body 20 is configured on the contact surface 15 to be particularly wear resistant. The layer 20.3 may, in turn, be selected such that the creation of a connection between the channel wall 25.1 and the body 20 is simplified, for example by means of welding.

For the heatable body 20 per se and in particular for the plate 20.1 aluminium or an aluminium alloy is a suitable material (due to the good thermal conductivity and the low weight). Also the use of copper or a copper alloy is conceivable. The layer 20.2 may, for example, be made from steel, in order to ensure a high degree of wear resistance. The layer 20.3 may, for example, consist of copper or steel. Such layers 20.2 and 20.3 may, for example, be applied to the plate 20.1 by explosion plating or high pressure rolling. In the present case, for example, copper may be regarded as a suitable material for the channel wall 25.1, in order to ensure a high degree of thermal conductivity.

Figure 2:
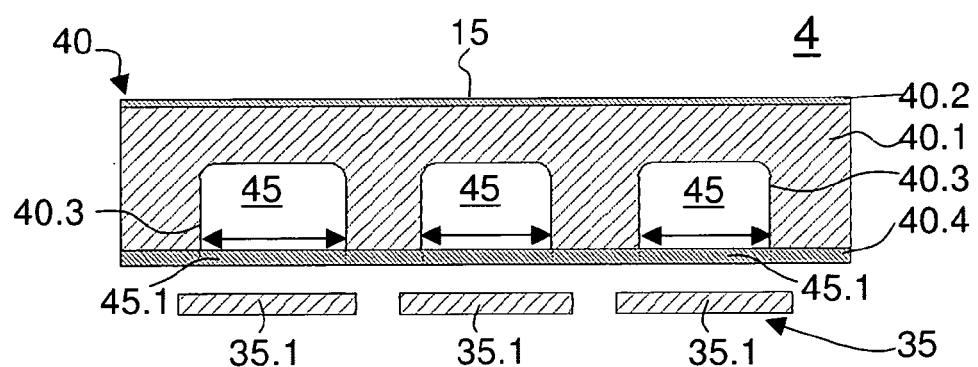
FIG. 2 shows a cross section through a second embodiment of the heating plate according to the invention, comprising heating means according to FIG. 1.
Figure 3:
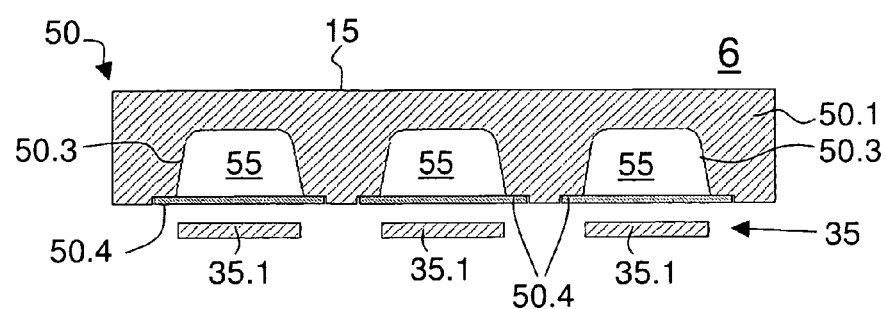
FIG. 3 shows a cross section through a third embodiment of the heating plate according to the invention comprising heating means according to FIG. 1.
Figure 4:
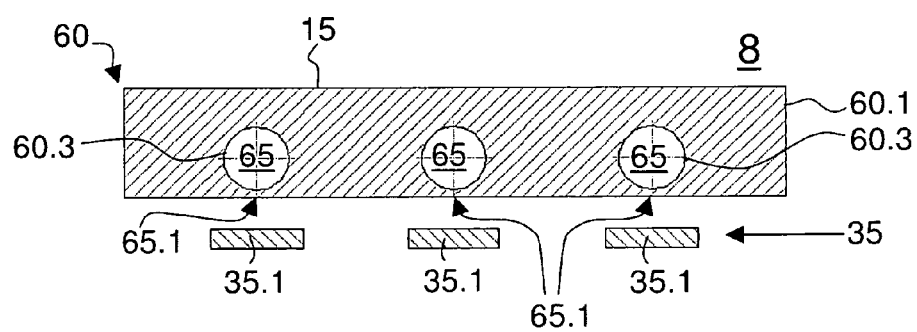
FIG. 4 shows a cross section through a fourth embodiment of the heating plate according to the invention comprising heating means according to FIG. 1.

FIGS. 2-4 show heating plates 4, 6, and 8 which differ from the heating plate 2 according to FIG. 1 mainly by different implementations of heating channels, the heating means 35 according to FIG. 1 being used as heating means.

The heating plate 4 according to FIG. 2 comprises a heatable body 40 comprising a heating channel 45. The body 40 consists of: a plate 40.1, in which on one side a groove 40.3 of meandering configuration is formed; a layer 40.2, which is connected to the plate 40.1 on a side located opposite the groove 40.3 and forms the contact surface 15 for a workpiece to be heated; and a cover plate 40.4, which covers and sealingly seals the groove 40.3 on the side located opposite the contact surface 15. The heating channel 45 is in this case formed in the groove 40.3 and respectively defined by the plate 40.1 and the cover plate 40.4. A heating fluid with which the heating channel is filled may be heated, in the present case, by regions 45.1 of the cover plate 40.4 being heated (the regions 45.1 are indicated in FIG. 2 by dashed lines and the width of the respective region 45.1 is identified in FIG. 2 by a double arrow) by means of heating devices 35.1 for inductive heating. As shown in FIG. 2, the heating devices 35.1 for inductive heating are arranged outside the heating channel 45 at a distance from the cover plate 40.4 in the vicinity of the regions 45.1. The regions 45.1 of the cover plate 40.4 represent in the present case "channel walls" in the sense of the definition of the invention.

The cover plate 40.4 may be connected to the plate 40.1 according to different methods, in order to seal the channel 45 sealingly, for example by means of welding, soldering or methods for plating (for example explosion plating or rolling). The cover plate 40.4 could also be fastened to the plate 40.1 by conventional fastening means such as screws. In this case, it may possibly be necessary to seal the channel 45 with suitable sealing elements. The materials for the plate 40.1, the layer 40.2 and the cover plate 40.4 may be selected according to the same (aforementioned) principles as the materials for the corresponding parts of the heating plate 2 (i.e. plate 20.1, the layer 20.2 and the channel wall 25.1) of the heatable body 20: the plate 40.1 could, for example, be made of aluminium, an aluminium alloy, copper or a copper alloy, the layer 40.2 could be made of steel and the cover plate 40.4 could be made of copper.

In order to optimise the efficiency of the inductive heating, the material for the cover plate 40.4 may in the case of the heating plate 4 be selected according to the same principles as the material for the channel wall 25.1 of the heating plate 2, i.e. the cover plate 40.4 may, for example, be made from an electrically conductive material, for example a metal, and/or a magnetisable material, for example a ferromagnetic material, in particular a ferromagnetic metal such as iron or an iron alloy (for example steel).

The heating plate 6 according to FIG. 3 comprises a heatable body 50. The heatable body 50 comprises a plate 50.1, on which on one side the contact surface 15 is arranged, on the side of the plate 50.1 located opposite the contact surface 15 a groove 50.3 being formed, which defines a heating channel 55 filled with a heating fluid. The heatable body 50 corresponds structurally to the heatable body 40, insofar as the heating channel 55 in its longitudinal direction has the same path as the heating channel 45 of the heating plate 4. In contrast to the heating channel 45, the heating channel 55 is covered on the side remote from the contact surface 15 by a plurality of cover plates 50.4 and sealingly closed. Each of the cover plates 50.4 respectively covers one of a plurality of longitudinal portions of the groove 50.3. The cover plates 50.4 may be designed as narrow sheet metal strips, and have (transversely to the respective longitudinal portion of the heating channel 55) a width which is at least as large or larger than the width of the respective longitudinal portion of the heating channel 55. The cover plates 50.4 may be connected to the plate 50.1 by welding or soldering. Alternatively, the cover plates 50.4 may be fastened to the plate 50.1 by fastening means such as screws, the heating channel 55 being able to be sealed against an escape of heating fluid.

As FIG. 3 shows, the cover plates 50.4 in the case of the heating plate 6 may be heated by the heating means 35. Accordingly, the cover plates 50.4 represent in the present case "channel walls" in the sense of the definition of the invention.

In the case of the heating plate 6 according to FIG. 3 the heating means 35 are provided with a plurality of heating devices 35.1 for the inductive heating of the cover plates 50.4, the respective heating device 35.1 being arranged outside the heating channel 55 at a distance from the respective cover plate 50.4. Heat which is produced by one of the heating devices 35.1 in one of the cover plates 50.4 is able to be introduced through the respective cover plate 50.4 of the heating channel 55 by thermal transfer into the heating fluid. The material of the cover plates 50.4 may be selected to be the same as the material of the cover plate 40.4 in the case of the heating plate 4.

The heating plate 8 according to FIG. 4 comprises a heatable body 60 with a contact surface 15 for a workpiece and with a heating channel 65, which is filled with a heating fluid. The heating channel 65 consists of a plurality of bores 60.3 which are formed opposite to the contact surface 15 and parallel to the contact surface 15, and are connected to one another such that the heating fluid may circulate in the heating channel 65 parallel to the contact surface 15. The heating fluid in the heating channel 65 may be heated from the side of the heatable body 60 opposing the contact surface 15 by heating devices 35.1 for inductive heating. In the present case, one respective region 65.1 of the plate 60.1, which is formed between one of the bores 60.3 and the surface of the plate 60.1 opposing the contact surface 15, may be regarded as a "channel wall" in the sense of the definition of the invention. The heating devices 35.1 of the heating means 35 are, in the case of the heating plate 8, respectively arranged at a distance from one of the channel walls 65.1. The plate 60.1 may be made from an electrically conductive material, for example from a metal, and/or from a magnetisable material, for example a ferromagnetic material, in particular a ferromagnetic metal such as iron or an iron alloy (for example steel).

Figure 5:
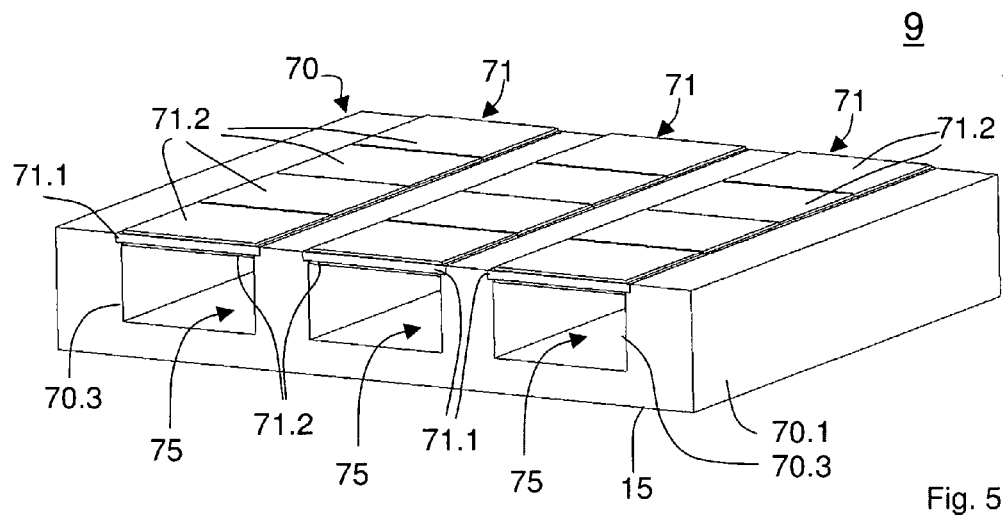
FIG. 5 shows a perspective view of a fifth embodiment of the heating plate according to the invention, shown without heating means.

FIG. 5 shows a heating plate 9 which in terms of design is similar to the heating plate 6 according to FIG. 3. The heating plate 9 comprises a heatable body 70 which—similar to the heatable body 50—consists of a plate 70.1 with a contact surface 15 for a workpiece and with a heating channel 75, the heating channel 75—similar to the heating channel 55 of the heating plate 6—being formed in a groove 70.3 on the side of the plate 70.1 located opposite the contact surface 15, and being filled with a heating fluid. The groove 70.3 is in this case covered by a plurality of cover plates 71, each cover plate 71—similar to one of the cover plates 50.4—sealingly closing a longitudinal portion of the groove 70.3. Each of the cover plates accordingly represents a "channel wall" in the sense of the definition of the invention and may—similar to the cover plates 50.4 in the case of the heating plate 6—be heated, for example, by heating means 35, in order to permit a heating of the heating fluid in the heating channel 75.

The cover plates 71 differ from the cover plates 50.4 in that the cover plates 71 are of multilayered construction. As indicated in FIG. 5, each cover plate comprises a supporting part 71.1 (in the form of a plate) which is connected at the edges to the plate 70.1 such that the channel 75 is sealed against the escape of heating fluid. The material for the supporting part 71.1 may thus be selected such that the supporting part may be connected by specific techniques, for example by welding or soldering—particularly easily and reliably to the plate 70.1. In the present case, for example, both the plate 70.1 and the supporting part 71.1 of the cover plate 71 could be made from aluminium, it being ensured by this choice of materials that the supporting part 71.1 of the cover plate 71 may be connected to the plate 70.1 by welding. The cover plate 71 may on one side or—as shown in FIG. 5—both on the side of the channel 75 and also on the side remote from the channel 75 be plated by a layer 71.2, the layer 71.2 being able to consist of a material which differs from the material of the supporting part 71.1.

The multilayered construction of the cover plates 71 makes it possible, by a suitable choice of materials for the different layers, to optimise the properties of the cover plates 71 according to different requirements. The material of the respective layer 71.2, for example, does not necessarily have to be able to be connected by means of welding to the material of the plate 70.1, in particular—as mentioned—in the present case a connection may be produced which may be subjected to load between one of the cover plates 71 and the plate 70.1, via a connection between the respective supporting part 71.1 and the plate 70.1. The material of the respective layer 71.2 may, however, be selected, for example, so that the respective layer 71.2 is optimised with regard to inductive heating. Accordingly, the respective layer 71.2 may be made from an electrically conductive material, for example from a metal and/or a magnetisable material, for example a ferromagnetic material, in particular a ferromagnetic metal, such as iron or an iron alloy (for example steel).

The supporting parts 71.1 do not necessarily have to be uniformly covered by the layer 71.2. As indicated in FIG. 5, each cover plate 71 on the surface has a plurality of regions located adjacent to one another, at the boundaries thereof respectively different layers 71.2 arranged adjacent to one another, being separated from one another (the respective different "regions" in FIG. 5 comprising the respective layers 71.2 being separated by a solid line and respectively identified by the reference numeral 71.2). This separation of the different layers 71.2 is helpful in order to reduce the effect of the variable thermal expansion of different materials.

Figure 6:
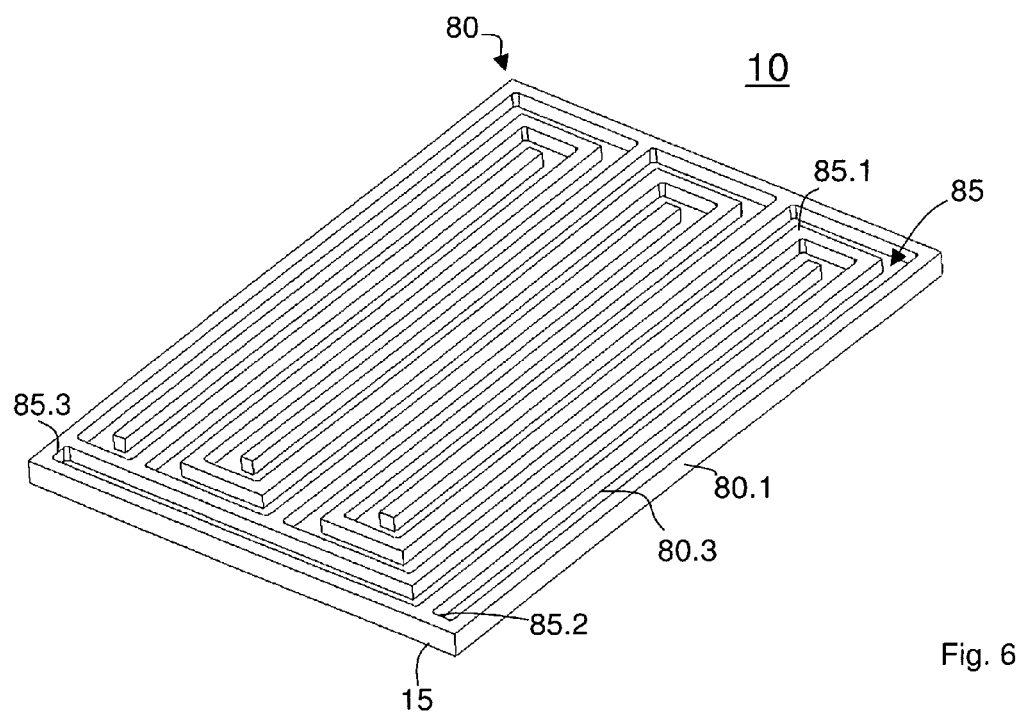
FIG. 6 shows a perspective view of a part of a sixth embodiment of the heating plate according to the invention, shown without heating means.
Figure 7:
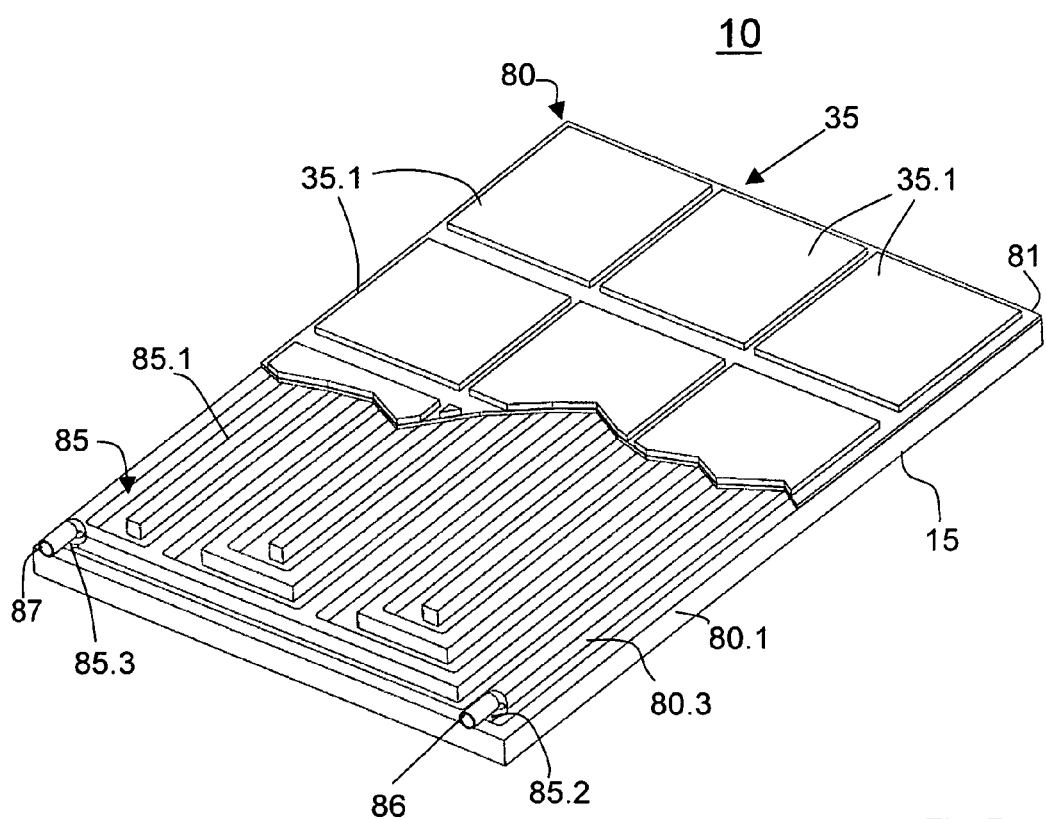
FIG. 7 shows the embodiment according to FIG. 6, comprising heating means.

FIGS. 6 and 7 show a heating plate 10 which may be regarded as a further development of the heating plate 4 according to FIG. 2. The heating plate 10 comprises a heatable body 80 with a contact surface 15 for a workpiece and with a heating channel 85, which is filled with a heating fluid.

The heatable body 80 comprises a plate 80.1, in which on one side a groove 80.3 of meandering configuration is formed. On the plate 80.1 a cover plate 81 is fastened, which covers and sealingly seals the groove 80.3 on the side opposing the contact surface 15. The heating channel 85 is in this case formed in the groove 80.3 and respectively defined by the plate 80.1 and the cover plate 81. Those regions of the cover plate 81 which define the heating channel 85, may respectively be regarded as the "channel wall" in the sense of the definition of the invention.

The heating channel 85 is made up of a plurality of longitudinal portions, which are connected to one another and arranged relative to one another either at right angles to one another or adjacent to one another in parallel, longitudinal portions of the heating channel 85 respectively arranged adjacent to one another being separated by a partition 85.1. The heating channel 85 has a first channel end 85.2 and a second channel end 85.3, at the first channel end 85.2 an inlet opening 86 being arranged for the heating fluid and at the second channel end 85.3 an outlet opening 87 being arranged for the heating fluid. The outlet opening 87 is connected, during the operation of the heating plate 10, by means of a connecting line (not shown in FIGS. 6 and 7) to the inlet opening 86, so that the heating fluid may circulate in the longitudinal direction of the heating channel 85.

As may be derived from FIGS. 6 and 7, the heating fluid is guided in the heating channel 85 such that the heating fluid when circulating through the heating channel 85 flows through two adjacent longitudinal portions of the heating channel 85, respectively in opposing directions (counterflow principle). This type of guidance of the heating fluid promotes a temperature equalisation in the heating channel 85 and in the plate 80.1 and is accordingly helpful in order to achieve a temperature distribution on the contact surface 15 which is as uniform as possible.

For heating the heating fluid, in the present example the heating means 35 are provided with a plurality of heating devices 35.1. The heating devices 35.1 are arranged on the surface of the cover plate 81 almost over the entire area. The size of the heating devices 35.1 in this case is dimensioned so that the cover plate 81 in each of two dimensions is respectively covered by a plurality of heating devices 35.1.

By this two-dimensional arrangement of the heating devices 35.1 over the entire area, for example, it is achieved that a plurality of heating devices 35.1 on the respective channel wall are distributed over a plurality of regions of the channel wall, respectively different regions of the channel wall being able to be heated respectively by different heating devices 35.1.

It may further be achieved that a particular heating device 35.1 (as a result of the heat produced by this heating device in the cover plate 81 and/or the respective heat flows produced), may heat the heating fluid at the same time in a plurality of portions (for example arranged adjacent to one another) of the heating channel 85, by the heat flow produced by said particular heating device 35.1 being introduced at the same time into the heating fluid, distributed over a plurality of longitudinal portions of the heating channel 85 arranged adjacent to one another. By the aforementioned measures, local heat losses which may occur in the heating fluid when flowing through the heating channel 85 may be compensated.

Moreover, there is the possibility of adjusting the thermal output (heat flows) of the respective heating devices 35.1 respectively independently of one another. In this manner, the heat flows which are produced by different heating devices 35.1 in the cover plate 81 and introduced into the heating fluid, may be controlled in two dimensions depending on the respective location. In order to control the heat flows produced by the heating devices 35.1, so that on the contact surface 15 a predetermined temperature distribution is achieved, it is also possible to measure the current temperature distribution with sensors and, if deviations occur between the current temperature distribution and the predetermined temperature distribution, to eliminate or at least to minimise these deviations by controlling the heat flows respectively produced by one of the heating devices 35.1.

The heating channel 85 of the heating plate 10 may be modified easily within the scope of the invention: it could for example be replaced by a plurality of channel portions, which are arranged in parallel to one another or branched, or by a plurality of individual heating channels.

Figure 8:
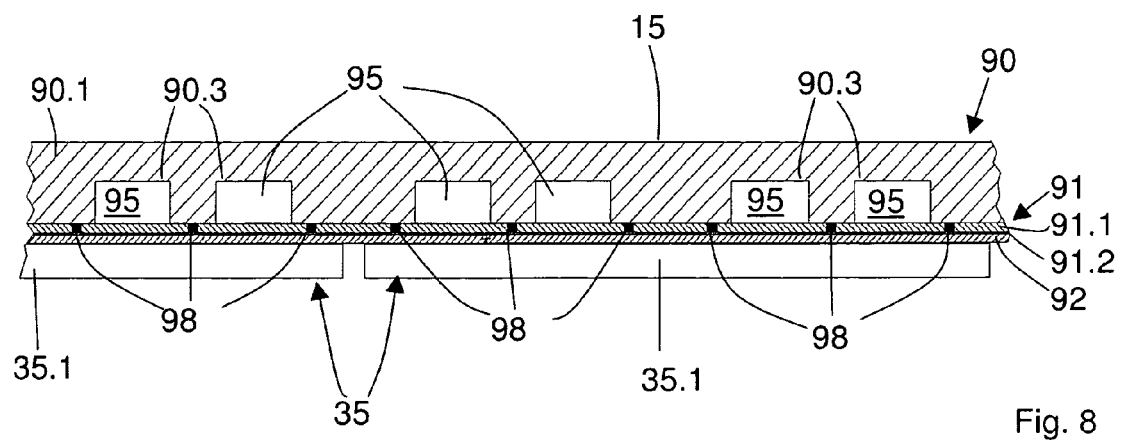
FIG. 8 shows a cross section through a seventh embodiment of the heating plate according to the invention comprising heating means according to FIG. 1.
Figure 9:
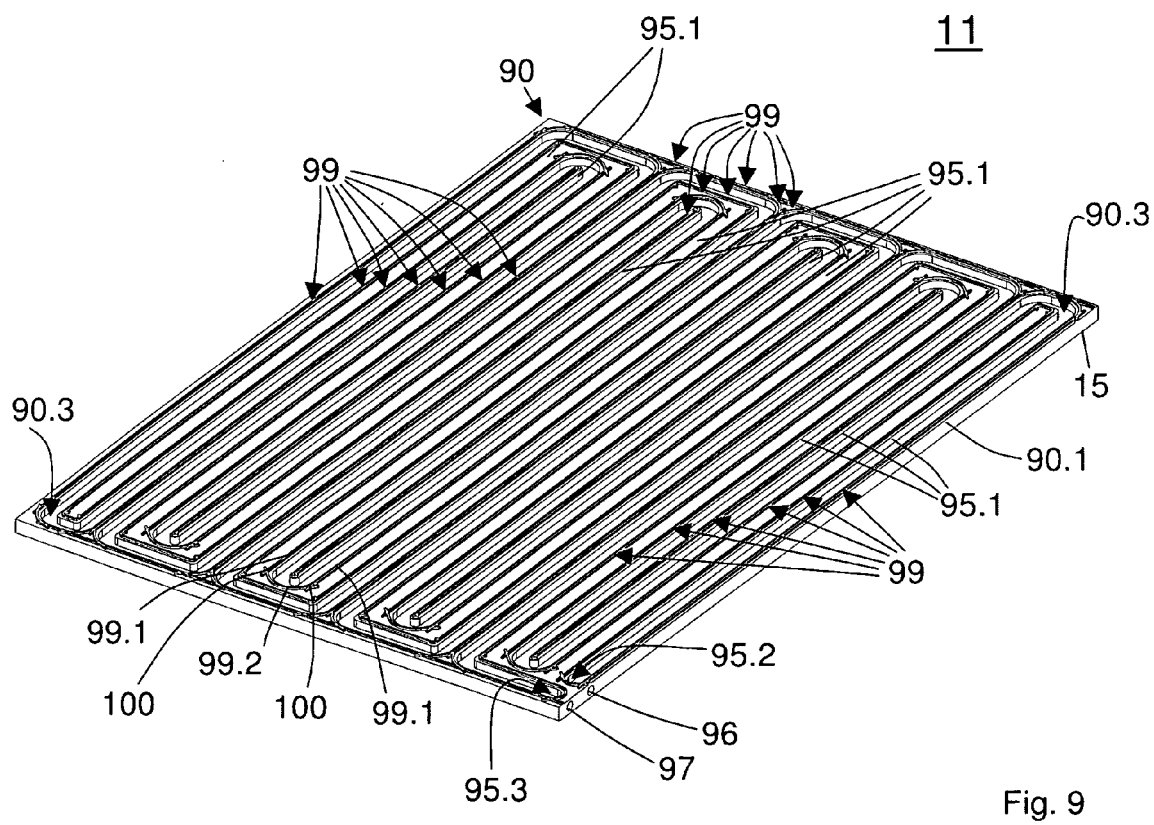
FIG. 9 shows a perspective view of a part of a heating plate according to FIG. 8, shown without heating means.
Figure 10:
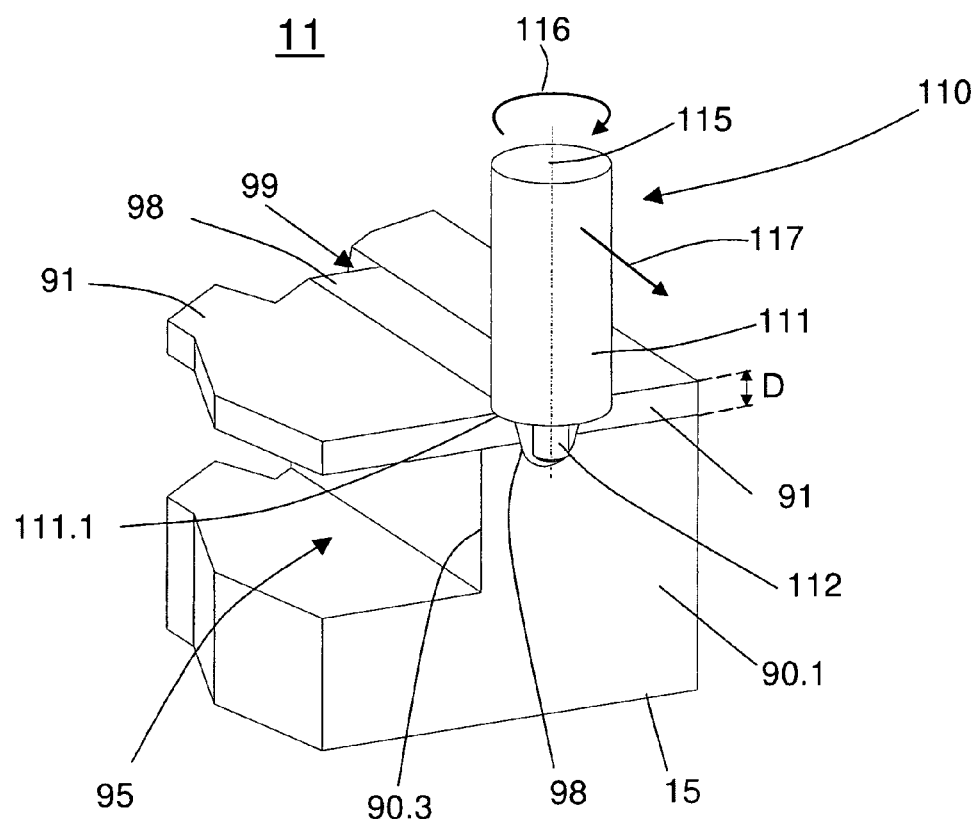
FIG. 10 shows a portion of the heating plate according to FIG. 8, shown together with a tool for producing a welded connection between different parts of the heating plate.

FIGS. 8-10 show a heating plate 11 which may be regarded as a further development of the heating plate 10 according to FIGS. 6 and 7. The heating plate 11 comprises a heatable body 90 with a contact surface 15 for a workpiece and with a heating channel 95 which is filled with a heating fluid.

As FIG. 9 shows, the heatable body 90 comprises a base body in the form of a plate 90.1, one side thereof forming the contact surface 15 and in which a groove 90.3 is formed on one (second) side located opposite the contact surface 15. The groove 90.1 may, for example, be produced by means of milling. FIG. 9 shows the plate 90.1 in a perspective view, which permits a view of the side of the plate 90 remote from the contact surface 15 and thus of the groove 90.3.

On the heatable body 90 and/or on the plate 90.1 a cover plate 91 is fastened, which covers the groove 90.3 on the side of the plate 90.1 located opposite the contact surface 15, the heating channel 95 in the groove 90.3 being formed between the plate 90.1 and the cover plate 91 (FIG. 8).

The groove 90.3 is made up of a plurality of groove portions which are respectively aligned substantially parallel to the contact surface 15 and arranged adjacent to one another (either parallel to one another or at right angles to one another) and respectively connected to one another, such that the entirety of all groove portions form a continuous groove configured in a meandering shape, for the heating fluid (FIG. 9).

In this case, adjacent portions of the groove 90.3 and/or of the heating channel 95 are respectively separated from one another by partitions 95.1 (FIG. 9).

The heating channel 95 has a first channel end 95.2 and a second channel end 95.3, at the first channel end 95.2 an inlet opening 96 being arranged for the heating fluid and at the second channel end 95.3 an outlet opening 97 being arranged for the heating fluid. The outlet opening 97 is connected, during operation of the heating plate 11, by means of a connecting line (not shown in FIGS. 8 and 9) to the inlet opening 96, such that the heating fluid may circulate in the longitudinal direction of the heating channel 95.

As may be derived from FIG. 9, the heating fluid is guided in the heating channel 95 such that the heating fluid when circulating through the heating channel 95 flows through two adjacent longitudinal portions of the heating channel 95 respectively in opposing directions (as in the case of the heating channel 85 according to FIG. 6).

As indicated in FIG. 8, on the side of the heating plate 11 opposing the contact surface 15 heating means 35 are arranged which comprise a plurality of heating devices 35.1 for inductive heating of the cover plate 91. The cover plate 91 accordingly forms a "channel wall" within the meaning of the invention.

As FIG. 8 indicates, the heating devices 35.1 extend transversely to the respective portions of the groove 90.3 over a sufficiently large distance that a particular heating device 35.1 (as a result of the heat produced by this heating device in the cover plate 91 and/or the respectively produced heat flow) is able to heat up the heating fluid at the same time in a plurality of portions (arranged adjacent to one another) of the heating channel 95, by the heat flow produced by said particular heating device 35.1 being introduced at the same time into the heating fluid, distributed via a plurality of adjacently arranged longitudinal portions of the heating channel 95.

The plate 90.1 is preferably produced from a metallic material, for example from copper, a copper alloy, aluminium, an aluminium alloy or steel.

In order to ensure that the cover plate 91 may be heated inductively, the cover plate consists of an electrically conductive material, for example a metal.

In order to ensure that the cover plate 91 may be inductively heated with a high degree of efficiency, the cover plate 91 may be formed from a magnetisable material, for example from a ferromagnetic material, or in one or more regions respectively comprise a plurality of layers, at least one of these layers being formed from a magnetisable material, for example from a ferromagnetic material.

In the embodiment according to FIG. 8, the cover plate 91 consists of two layers: a plate 91.1 which is intended to ensure the mechanical stability of the cover plate 91, and may be made for example from a light metal, and a magnetisable layer 91.2, which for example may consist of a ferromagnetic material. The layer 91.2 may, for example, be applied to the plate 91.1 by means of plasma spraying, vapour deposition or other coating methods.

Between the cover plate 91 and the heating devices 35.1 (optionally)—as shown in FIG. 9—a thermally insulating body 92 may be arranged, for example a plate or a film or a mat or a layer applied to the cover plate 91 (on the side remote from the heatable body) made of thermally insulating material. This arrangement of the thermally insulating body 92 has the advantage that the heating devices 35.1 may be fastened to the heating plate 11 such that they are in contact with the thermally insulating body. This permits a simple mounting of the heating devices 35.1 (without complicated positioning relative to the cover plate 91), it being additionally ensured that the heating devices 35.1 during inductive heating of the cover plate 91 are not excessively heated (due to thermal conduction, originating from the inductively heated cover plate 91).

As is indicated in FIG. 8, the cover plate 91 is fastened to the heatable body 90 (i.e. the plate 90.1) by means of one or more welded connections 98 between the cover plate 91 and the heatable body 90 (i.e. the plate 90.1).

In the present example, the respective welded connections 98 extend between the cover plate 91 and the heatable body (i.e. the plate 90.1) such that on each of two opposing sides of the groove 90.3 welded connections are produced along welding paths 99, which respectively extend along each portion of the heating channel 95 and/or along each portion of the groove 90.3. In this manner, the heating channel 95 may be sealed by the respective welded connections 98 against an escape of the heating fluid, as is explained hereinafter.

In FIG. 9, the extent of the welding paths 99 (relative to the groove 90.3 on the side of the plate 90.1 remote from the contact surface 15) is shown, along which a welded connection 98 between the plate 90.1 and the cover plate 91 is produced (by means of a suitable tool for producing a welded connection). As FIG. 9 indicates, the welding paths 99 may be made up of individual sections 99.1 and 99.2, which may extend in a straight and/or curved line and respectively intersect at points of intersection 100. The welded connections 98 between the plate 90.1 and the cover plate 91 may successively be produced along the respective sections 99.1 and/or 99.2 of the welding paths 99.

As FIG. 9 indicates, the creation of welded connections 98 between the plate 90.1 and the cover plate 91 along the welding paths 99 and/or the respective sections 99.1 and 99.2 leads to welded connections which extend on each of two opposing sides of the groove 90.3 continually (i.e. without gaps) over the entire length of the heating channel 95. Accordingly, the heating channel 95 is sealed by the welded connections 98 against an escape of the heating fluid (between the plate 90.1 and the cover plate 91).

The welded connections 98 may, for example, be produced by means of a method which is also known by the term "friction stir welding" (FSW).

FIG. 10 shows how welded connections 98 between the plate 90.1 and the cover plate 91 may be produced along the welding paths 99 with a tool 110 (already known from EP 0615480 B1) for producing a welded connection by means of friction stir welding.

In the view according to FIG. 10 the cover plate 91 is brought into contact with the plate 90.1 and thus brought into a position relative to the plate 90.1, in which the cover plate 91 is intended to be fixed to the plate 90.1 by means of the welded connections 98.

The tool 110 comprises a cylinder 111, which may be rotated about its longitudinal axis 115 by means of a drive (not shown in FIG. 10), (as indicated in FIG. 10 by the arrow 116, which indicates a rotational direction). On one front face 111.1 of the cylinder 111 (configured perpendicular to the longitudinal axis 115), a probe 112 is fastened to the cylinder 111. The probe 112 is arranged rotationally symmetrically to the longitudinal axis 115 and also has in the present example (but not necessarily) the shape of a cylinder. The probe 112 is, moreover, rigidly connected to the cylinder 111, so that the probe also rotates about the longitudinal axis 115, if the cylinder 111 is moved in rotation about the longitudinal axis 115.

In order to be able to produce by means of the tool 110 a welded connection 98 between the cover plate 91 and the plate 90.1, both the respective material of the cover plate 91 and also the respective material of the plate 90.1 in the region of boundary surfaces on which the cover plate 91 and the plate 90.1 are brought into contact with one another, have to be treated by the rotating probe 112. In order to allow such a treatment, the probe 112 should be made from a material which is both harder than the respective material of the cover plate 91 and harder than the respective material of the plate 90.1. In this manner, the materials of the cover plate 91 and the plate 90.1 may be treated by the probe 112, without the probe 112 wearing out. Moreover, the size of the probe 112 in the direction of the longitudinal axis 115 should be sufficiently large that the probe 112 may completely penetrate the cover plate (from the side remote from the contact surface 15). The size of the probe 112 in the direction of the longitudinal axis 115 is thus preferably greater than the thickness D of the cover plate 91 in order to ensure that the cover plate 91 and the plate 90.1 may be treated by the tool 110, if the longitudinal axis 115 is aligned perpendicular to the cover plate 91.

As FIG. 10 further indicates, the diameter of the probe 112 (perpendicular to the longitudinal axis 115) is smaller than the diameter of the cylinder 111 (perpendicular to the longitudinal axis 115). Accordingly, the front face 111.1 of the cylinder 111 forms in the surroundings of the probe 112 a shoulder which may be brought into contact with a surface of the cover plate 91, if the probe 112 penetrates sufficiently deeply in the cover plate 91 to be treated and/or the plate 90.1 to be treated. If the front face 111.1 under these circumstances is brought into contact with the cover plate 91, at the same time a force may be transmitted via the front face 111.1 by means of the tool 110 to the cover plate 91, in order to press the cover plate 91 against the plate 90.1 and optionally to influence the treatment of the cover plate 91 and the plate 90.1.

In order to produce welded connections 98 between the cover plate 91 and the plate 90.1 by means of friction stir welding, the tool 110 is arranged in a first method step initially on the side of the plate 90.1 remote from the contact surface 15, such that the probe 112 at one point of the welding path 99 is in contact with the cover plate 91, the longitudinal axis 115 of the cylinder 111 being preferably aligned (but not necessarily) perpendicular to the cover plate 91. Subsequently, the cylinder 111 and thus the probe 112 are set in rotation (according to arrow 116 in FIG. 10) and pressed in the direction of the longitudinal axis 115 against the cover plate 91 and/or in the direction of the plate 90.1. Due to the friction between the surface of the rotating probe 112 and the cover plate 91, the temperature of the cover plate 91 is increased in the surroundings of the probe 112, generally it being ensured that the temperature of the cover plate 91 due to the aforementioned friction does not rise to such an extent that the temperature locally reaches or exceeds the melting point of the material of the cover plate 91. Generally the temperature of the cover plate 91 rises due to the friction in the surroundings of the probe 112 such that the material of the cover plate 91 is plasticised in the surroundings of the probe 112, i.e. the material of the cover plate 91 becomes soft in the surroundings of the probe 112. Additionally, a material transport is induced in the plasticised region of the cover plate 91 by means of the probe 112. In the further course of the method, the tool 110 is subjected to pressure along the longitudinal axis 115 in the direction of the plate 90.1. The probe 112 penetrates under the above circumstances the plasticised region of the cover plate 91, until the probe 112 pierces the cover plate 91 and subsequently reaches the plate 90.1. At the same time, the rotating probe 112 interacts with the plate 90.1 until the material of the plate 90.1 in the surroundings of the probe 112 is also plasticised due to a temperature rise induced by friction. The penetration of the probe 112 in the cover plate 91 and/or the plate 90.1 generally terminates when the front face 111.1 of the cylinder 111 reaches the surface of the cover plate 91 and thus prevents a further penetration of the probe 112 into the plate 90.1.

In further method steps, welded connections 98 may thus be produced along the welding paths 99 shown in FIG. 9 and/or along the respective sections 99.1 and 99.2 of the welding paths 99. For this purpose, the tool 110 is moved parallel to the surface of the cover plate 91 (as is indicated in FIG. 10 by an arrow 117 which indicates the respective direction of movement of the tool 110) and namely such that the probe 112 follows the respective welding paths 99 and/or the respective sections 99.1 and 99.2 of the welding paths 99. During this movement of the tool 110 (in the direction of the arrow 117) a transport of materials occurs in the regions of the cover plate 91 and the plate 90.1, which have been plasticised by the action of the probe 112. During this material transport, materials which originate from regions of the cover plate 91 and the plate 90.1, which—viewed in the direction of movement of the tool 110 according to the arrow 117—are arranged "in front" of the probe 112, are transported into a spatial region which—viewed in the direction of movement of the tool 110 according to arrow 117—is located "behind" the probe 112. The materials which have thus been plasticised and transported, cool in the aforementioned spatial region located "behind" the probe 112, they again solidify and in the solidified state form a stable connection between the cover plate 91 and the plate 90.1: the aforementioned welded connections 98 (see FIG. 10). Accordingly along the welding paths 99 shown in FIG. 9 and/or along the respective sections 99.1 and 99.2 of the welding paths 99 welded connections 98 respectively without gaps are produced, if the probe 112—as disclosed above—is moved along the welding paths 99 and/or along the respective sections 99.1 and 99.2 of the welding paths 99.

The aforementioned method has the advantage that relatively large plates 90.1 may be respectively welded cost-effectively with a correspondingly large cover plate 91, along relatively long welding paths 99, neither the respective plate 90.1 nor the respective cover plate 91 having to be locally melted.

Accordingly, the heating channel 95 may have a relatively long length and by means of the welded connections 98 may be sealed over its entire length between the plate 90.1 and the cover plate 91. A further advantage may be seen to be that no additional materials are required and/or used in order to produce a connection between the cover plate 91 and the plate 90.1.

Figure 11:
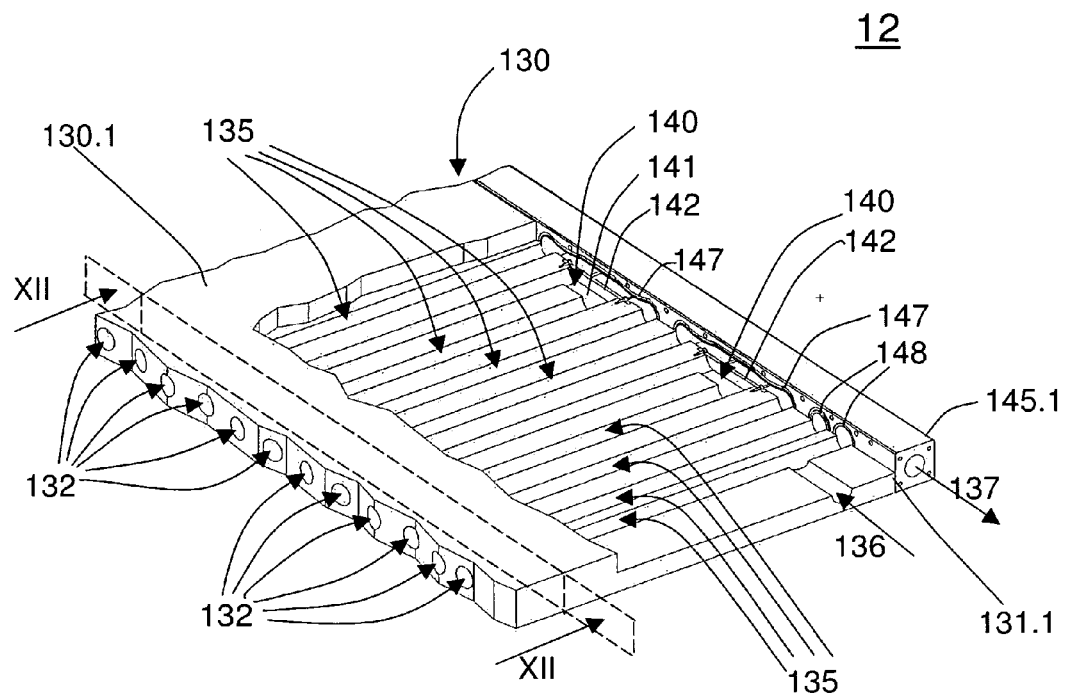
FIG. 11 shows a perspective view of a portion of an eighth embodiment of the heating plate according to the invention, shown without heating means.
Figure 12:
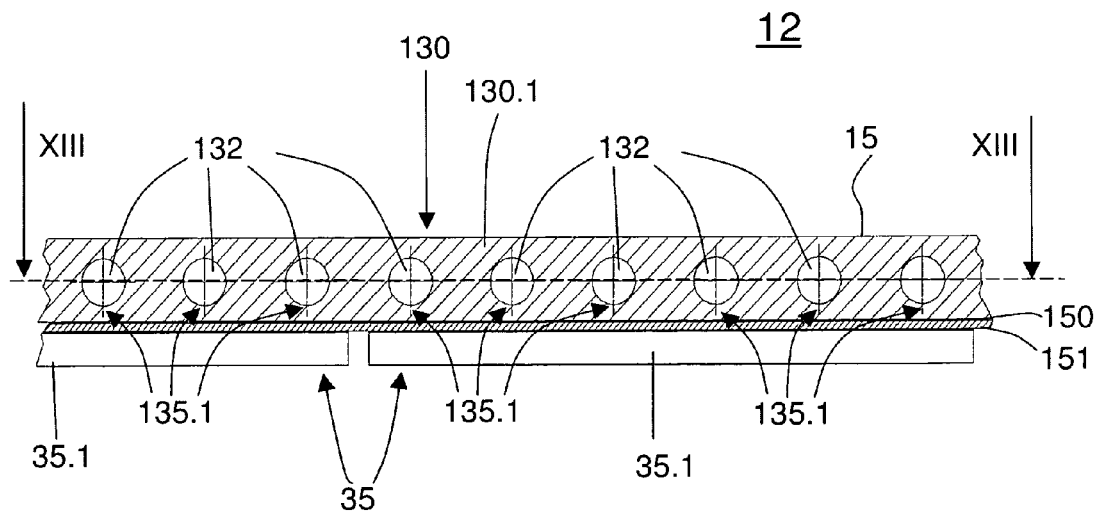
FIG. 12 shows a cross section through the heating plate according to FIG. 11 (cut along a plane perpendicular to the arrows XII in FIG. 11)
Figure 13:
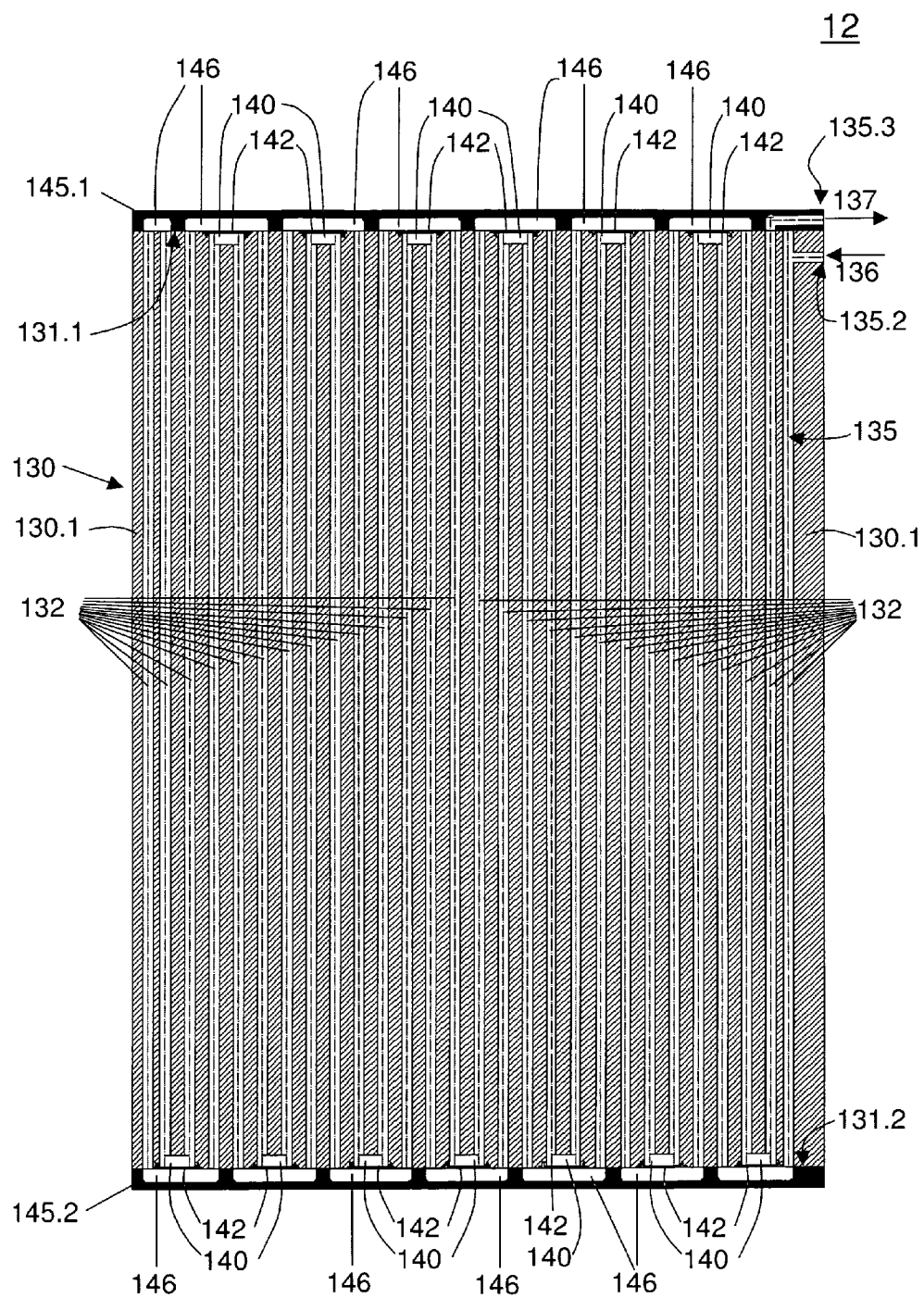
FIG. 13 shows a section through the heating plate according to FIG. 11, cut along the line XIII-XIII in FIG. 12.

FIGS. 11-13 show a heating plate 12 which may be regarded as a further development of the heating plate 8 according to FIG. 4. The heating plate 12 comprises a heatable body 130 with a contact surface 15 for a workpiece and with a heating channel 135 which is filled with a heating fluid.

The heating channel 135 has—in a projection of the contact surface 15—a path similar to that of the heating channel 95 of the heating plate 11 according to FIGS. 8 and 9, but is produced by other means.

As FIGS. 11-13 show, the heatable body 130 comprises a plate 130.1, which forms on one side the contact surface 15.

The plate 130.1 is in the present example (however not necessarily) rectangular and has a plurality of bores 132, which are respectively configured to be continuous between two opposing front surfaces 131.1 and 131.2 of the heatable body. The different bores 132 have a round cross section and are in the present case arranged parallel to one another and respectively arranged parallel to the contact surface 15.

The respective bores 132 form respectively a (longitudinal) portion of the heating channel 135 and are connected to one another via different connecting channels 140 and/or 146. As FIGS. 11 and 13 indicate, the connecting channels 140 and/or 146 extend in the present example (but not necessarily) respectively substantially perpendicular to the bores 132 and parallel to the front faces 131.1 and/or 131.2. In the present example, the connecting channels 140 and/or 146 respectively connect two bores 132 respectively at their ends at one of the front faces 131.1 and/or 131.2, such that all bores 132 and all connecting channels 140 and 146 respectively at their ends are connected in series to one another and accordingly respectively form different longitudinal portions of the heating channel 135.

Accordingly, the heating channel 135 has a first channel end 135.2 and a second channel end 135.3, at the first channel end 135.2 an inlet opening 136 being arranged for the heating fluid and at the second channel end 135.3 an outlet opening 137 for the heating fluid being arranged. The outlet opening 137 is connected, during operation of the heating plate 12, to the inlet opening 136 by means of a connecting line (not shown in FIGS. 11-13) such that the heating fluid may circulate in the longitudinal direction of the heating channel 135.

As may be derived from FIG. 13, the heating fluid is guided in the heating channel 135 such that the heating fluid, when circulating through the heating channel 135, flows through two adjacent longitudinal portions of the heating channel 135 respectively in opposing directions (as in the case of the heating channels 85 and 95).

Moreover, it is visible in FIG. 12 that on the side of the heating plate 12 opposing the contact surface 15, heating means 35 are arranged, which comprise a plurality of heating devices 35.1 for the inductive heating of those regions 135.1 of the heatable body 130 (and the plate 130.1 respectively), which on a side of the heatable body 130 (and the plate 130.1 respectively) remote from the contact surface 15 are adjacent to the respective bores 132. These regions 135.1 of the heatable body 130 and/or the plate 130.1 accordingly form a "channel wall" within the meaning of the invention.

As FIG. 12 indicates, the heating devices 35.1 extend transversely to the respective bores 132 over a sufficiently long distance that a particular heating device 35.1 may heat the heating fluid at the same time in a plurality of bores 132.

The plate 130.1 is preferably produced from a metallic material, for example from copper, a copper alloy, aluminium, an aluminium alloy or steel. With this proviso, the plate 130.1 is generally able to be inductively heated due to its relatively high electrical conductivity, generally by means of the heating devices 35.1 in the surroundings of the bores. If the plate 130.1 does not consist of a magnetisable material, on the side of the plate 130.1 located opposite the contact face 15 (at least partially in the vicinity of the respective bores 132) a layer 150 of magnetisable material, for example a ferromagnetic material, may be arranged. The layer 150 may, for example, be applied onto the plate 130.1 by means of plasma spraying, vapour deposition or other coating methods.

As FIG. 12 further indicates, between the heatable body 130 and/or the layer 150 and the respective heating device 135.1, a thermally insulating body 151 may be arranged (corresponding to the thermally insulating body 92 in the case of the heating plate 11, see FIG. 8).

This permits (as in the case of the heating plate 11) a simple mounting of the heating devices 35.1 (without costly positioning relative to the heatable body 130), it being additionally ensured that the heating devices 35.1 during inductive heating of the heatable body 130 do not heat up excessively.

Hereinafter possibilities for an implementation of the connecting channels 140 and/or 146 are shown which connect different bores 132.

As FIGS. 11 and 13 show, the connecting channels 140 are respectively arranged on one of the respective front faces 131.1 and/or 131.2 of the heatable body 130 (and the plate 130.1 respectively) and respectively produced in the form of a recess 141 formed in the heatable body 130 (and in the plate 130.1 respectively), which respectively opens into two of the respective bores 132 and, for example, may be produced by means of milling. Furthermore in the region of each recess 141 on the respective front face 131.1 and/or 131.2 of the heatable body 130 (and the plate 130.1 respectively) one cover element 142 is respectively arranged which covers the respective recess 141 and the respective bores 132 into which the recess 141 opens. Each of these cover elements 142 forms a portion of a wall of the heating channel 135 and accordingly serves for guiding the heating fluid within the heating channel 135.

As FIGS. 11 and 13 further show, the connecting channels 146 are respectively formed in one of two endpieces 145.1 and/or 145.2 which are arranged on one respective front face 131.1 and/or 131.2 of the heatable body 130 such that the respective endpiece 145.1 and/or 145.2 covers the respective bores 132 on the respective front face 131.1 and/or 131.2. At the same time, each connecting channel 146 on the side of the respective endpiece 145.1 and/or 145.2 facing the respective bores 132 opens into two of the bores 132 covered by the respective endpiece 145.1 and/or 145.2.

The respective connecting channel 146 may, for example, be configured as a bore or as a recess (for example able to be produced by means of milling) in the respective endpiece 145.1 and/or 145.2. Reference is further made to the fact that the outlet opening 137 in the present example is configured in the endpiece 145.1 in the form of a bore, which opens into one of the bores 132 (FIG. 13).

For sealing the heating channel 135 against an escape of heating fluid, in the present case cord seals 147 or sealing rings 148 are used which are respectively placed between one of the respective endpieces 145.1 and/or 145.2 and the respective front face 131.1 and/or 131.2 (respectively around one or more bores 132) (FIG. 11). The respective cover elements 142, in the present example, do not have to seal the recesses 140 sealingly, in particular a leakage between one of the recesses 141 and the plate 130.1 does not lead to heating fluid leaving the heating channel 135, provided the endpieces 145.1 and 145.2 relative to the plate 130.1 are sealed on the respective front faces 131.1 and/or 131.2 (for example by means of cord seals 147 and the sealing rings 148).

The heating plate 12 has the advantage that on the basis of a combination of a plurality of through-bores 132 inside the plate 130.1 and connecting channels 140 and/or 146 which respectively connect different bores 132 on front faces 131.1 and/or 131.2 in and/or on a relatively large plate 130.1, a relatively long heating channel 135 may be easily produced, in particular the connecting channels 140 and/or 146 are relatively easily accessible and therefore may be produced at relatively little cost. Moreover, the heating channel 135 may be sealed by simple means against an escape of heating fluid.

The heating plate 12 may be modified in different ways within the scope of the invention. For example, optionally for connecting the respective bores 132, exclusively the connecting channels 140 or exclusively the connecting channels 146 could be produced on one of the front faces 131.1 and/or 131.2 or on both front faces 131.1 and 131.2. Moreover, the connecting channels 140 and/or 146 may also be constructed such that they respectively connect more than two bores 132 to one another.

The invention claimed is:

1. Heating plate (12) for workpieces,
    comprising a heatable body (130) which on a first side has a contact surface (15) for the respective workpiece,
    comprising at least one heating channel (135) filled with a heating fluid for heating the heatable body (130), which heating channel (135) is formed in or on the heatable body (130) opposite the contact surface (15), and
    comprising heating means (35) for heating the heating fluid, wherein
    a channel wall (135.1) of the at least one heating channel (135) is configured to be inductively heated and the heating means (35) comprise at least one heating device (35.1) for inductively heating the respective channel wall (135.1),
    the respective heating device (35.1) being arranged outside the at least one heating channel (135) and the heating fluid in the at least one heating channel being able to be heated by a transfer of heat to be generated by means of the heating device (35.1) in the respective channel wall (135.1),
    the heatable body (130) comprising a plurality of bores (132) which are respectively configured to be continuous between two opposing front faces (131.1, 131.2) of the heatable body (130),
    the respective bores (132) respectively forming a portion of the at least one heating channel (135) and being connected to one another via connecting channels (140, 146) that are continuous for the heating fluid,
    each of the connecting channels (140, 146) connecting two of the bores (132) respectively at their ends at one of the two opposing front faces (131.1, 131.2), such that all bores (132) and all connecting channels (140, 146) respectively at their ends are connected in series to one another and accordingly respectively form different longitudinal portions of the at least one heating channel (135),
    the respective channel wall (135.1) being formed from regions of the heatable body (130) which on a side of the heatable body (130) remote from the contact surface (15) is adjacent to the respective bores (132), and
    at least one of the respective connecting channels (140) being arranged on one of the respective front faces (131.1, 131.2) of the heatable body (130) and being implemented in the form of a recess (141) formed in the heatable body (130), which opens into at least two of the respective bores (132),
    on one of the respective front faces (131.1, 131.2) a cover element (142) being arranged, which covers the recess (141) and the respective bores (132) into which the recess (141) opens.

2. Heating plate (12) according to claim 1, the heatable body (130) comprising a base body (130.1) made of copper, a copper alloy, aluminum, an aluminum alloy or steel.

3. Heating plate (12) according to claim 1,
    at least one of the respective connecting channels (146) being formed in an endpiece (145.1, 145.2) which is arranged on one of the respective front faces (131.1, 131.2) of the heatable body (130) such that the endpiece (145.1, 145.2) covers at least two of the respective bores (132), the at least one of the respective connecting channels (146) on the side of the endpiece (145.1, 145.2) facing the respective bores (132) opening into at least two of the bores (132) covered by the endpiece (145.1, 145.2).

4. Heating plate (12) according to claim 1, the heatable body (130) on the side located opposite the contact surface (15) at least partially comprising a layer (150) made of a magnetizable material.

5. Heating plate (12) according to claim 1, a thermally insulating body (151) being arranged between the heatable body (130) and the respective heating device (35.1).

6. Heating plate (12) according to claim 1, the at least one heating channel (135) comprising a plurality of adjacently arranged portions and the respective heating device (35.1) being arranged relative to the respective adjacently arranged portions of the at least one heating channel (135) such that the heating fluid is heatable in a plurality of portions of the at least one heating channel (135) by means of said heating device (35.1).

7. Heating plate (12) according to claim 4, the magnetisable material being a ferromagnetic material.

\* \* \* \* \*